Oct. 20, 1936.  F. WAGONER  2,058,276
CUT-OFF AND FLUID DISTRIBUTING VALVE COUPLING
Filed Jan. 7, 1936  2 Sheets-Sheet 1
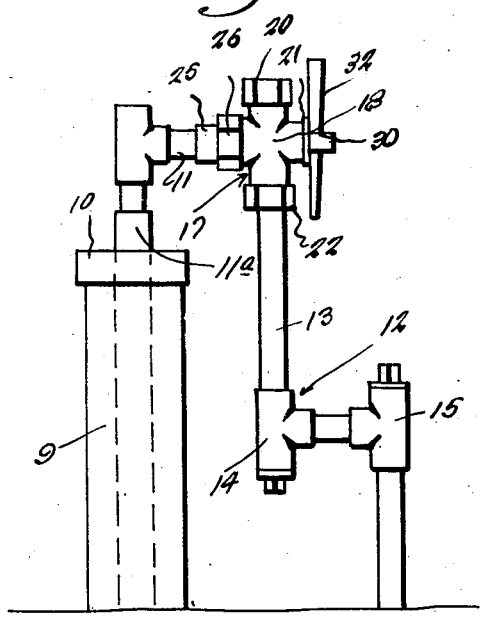
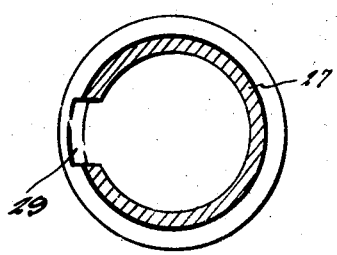
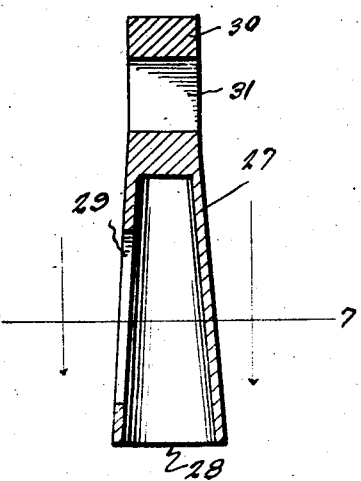
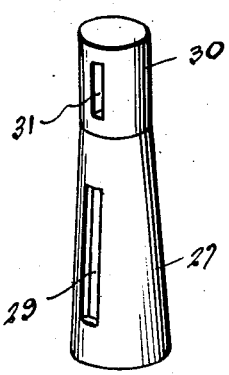
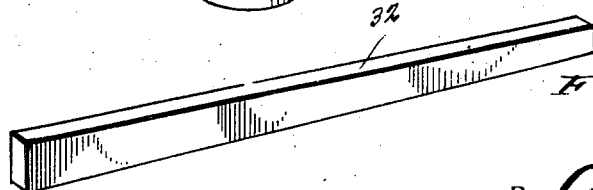
Inventor
Ford Wagoner
By Clarence A. O'Brien and
Hyman Berman
Attorneys Oct. 20, 1936.  F. WAGONER  2,058,276
CUT-OFF AND FLUID DISTRIBUTING VALVE COUPLING
Filed Jan. 7, 1936    2 Sheets-Sheet 2
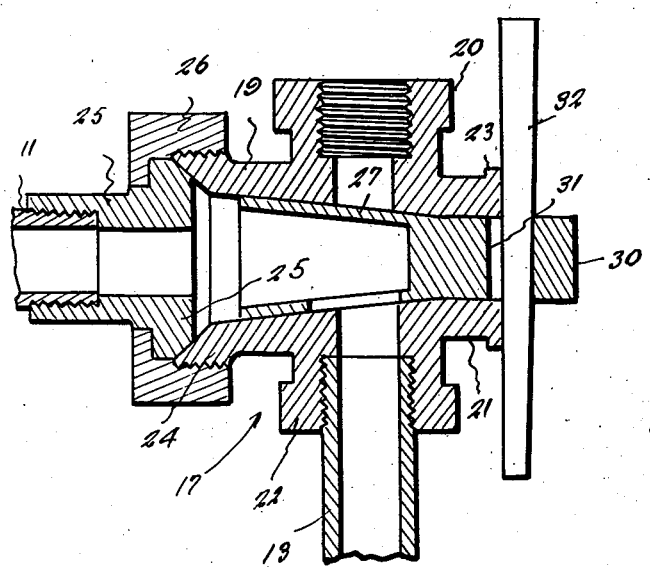
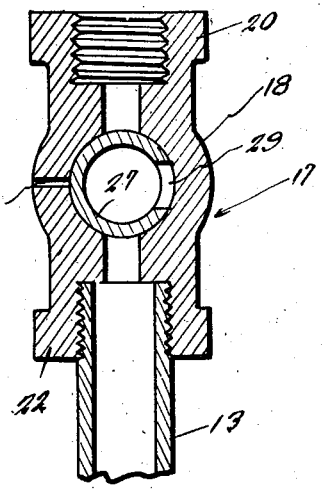
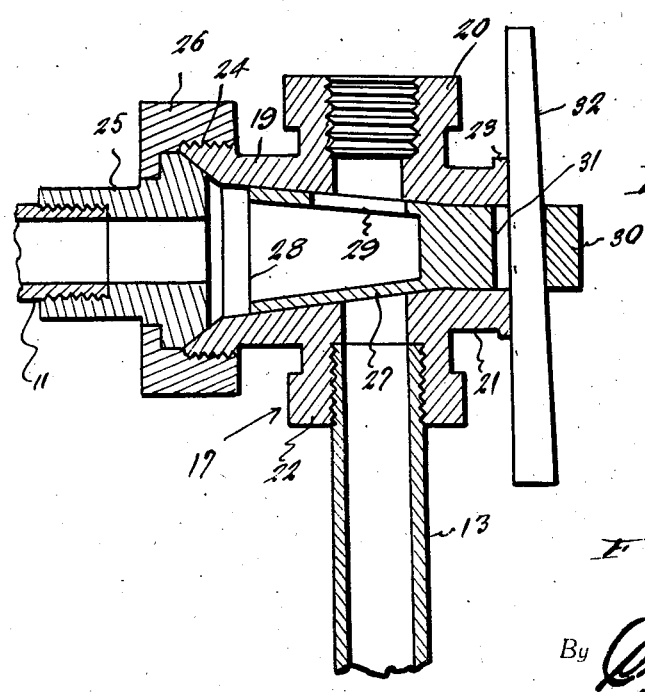
Inventor
Ford Wagoner Patented Oct. 20, 1936

2,058,276

UNITED STATES PATENT OFFICE 2,058,276

CUT-OFF AND FLUID DISTRIBUTING VALVE COUPLING

Ford Wagoner, St. Francisville, Ill.

Application January 7, 1936, Serial No. 58,012

2 Claims. (Cl. 166—15)

This invention relates to a novel method and fluid distributing valve means perfected with the thought in mind of serving in a practical and simplified way in conjunction with fluid wells, particularly oil wells.

In the oil fields, many different types and characters of valved pipe lines are utilized above the surface to cut off, test by bleeding, and for delivering the oil from the well to a remote source of use or tank storage as the case may be.

One well known method consists in joining the delivery or take-off line with the casing head, and this line includes means for coupling it to the tubing head, a selectively usable bleeding valve for test purposes, a separate individually controllable cut-off valve leading to the main delivery line, and a series of fittings and couplings making up the intake portion of the line.

The present invention has to do with an arrangement calculated to permit effective control to be had through the instrumentality of a unique unit possessing the consolidated function of a pipe coupling, and a three-way valve, whereby to divert the flow from the tubing into the main delivery line, to bleed the oil for test purposes, or to cut off the flow entirely.

More specifically indicated, however, the chief features which serve to distinguish this important improvement have to do with the special construction of the valve casing, the rotary plug valve associated therewith, and a simple lock-type controlling and operating handle.

Other features and advantages will become more readily apparent from the following description and drawings.

In the accompanying pictorial drawings, wherein like numerals are employed to designate corresponding parts throughout the views:

Figure 1 is an elevational view showing the well tubing, casing head, delivery pipe line, and the intervening multiple purpose unit constituting the essence of the invention hereinafter claimed.

Figure 2 is a view, on an enlarged scale, showing this multiple purpose unit, primarily in section, and partly in elevation.

Figure 3 is a view similar to Figure 2 emphasizing the utility in its special make-up.

Figure 4 is a vertical sectional view showing the manner in which the unit serves as a fluid cut-off valve.

Figure 5 is a sectional view of the valve element per se.

Figure 6 is a perspective view of the same part.

Figure 7 is a section on the line 7—7 of Figure 5.

Figure 8 is a perspective view of the detachable wedge type valve-operating and locking handle or lever.

Referring now to Figure 1 of the drawings it will be observed that the conventional oil well casing, projecting above the ground, is denoted by the numeral 9. The casing head 10 includes appropriate fittings to accommodate the lead-off nipple 11 extending from the well tubing 11a, the latter of which extends into the casing 9 and through the casing head 10. The delivery or take-off line is denoted as a unit by the numeral 12. This will obviously vary in construction. As a general rule it includes a depending pipe 13 connected by T-couplings 14 and 15 to the submerged ground pipe 16 which serves to carry off the oil to a storage tank (not shown) or other place of use. Ordinarily in the more complicated arrangement with which I am familiar, there is a cut-off valve in the pipe 13, associated pipe sections joined by a union, said pipe sections being joined to the nipple 11 by an extra T-coupling. Then too the T-coupling, as a general rule, is provided at its top with a hand-controlled oil test or bleed and relief valve. Hence there are some seven pieces or more at this point to complicate the assemblage and to necessitate using two separate valves. Moreover these valves sometimes are the hand-controlled globe type, though the cut-off valve is usually of the rotary tapered plug type, that is, an ordinary one-way valve and its construction necessitates the use of a wrench or tool in opening or closing the valve. This valve is subject to leakage and inconvenient operation because of frequent breakage. In my arrangement I provide the simple multiple purpose valve and coupling unit 17 to take the place of these seemingly needless accessories or appliances.

The one-piece cast casing may be said to be of general cruciform configuration. That is to say it includes a body portion 18 having a screw-threaded intake branch 19 (see Figure 2), an upstanding screw-threaded venting or bleed branch 20, a third branch 21 opposed to the intake branch 19 and hereinafter functioning as a bearing, and a depending discharge or outlet branch to which the pipe 13 is joined. The branch 21 terminates in a disk-like flange 23 and serves as a handle abutment in a manner to be more explicitly described.

The branch 19 has a flared threaded end 24 to form a beveled seat for the flanged end 25 of a jointing nipple or fitting 26 connected with the lead-off nipple 11. Here is provided a quick separable joint through the instrumentality of a flanged union 26 collectively cooperable with the flange 25 and the threaded end 24.

The branch 20 is internally screw-threaded to accommodate extra piping if necessary though, as a general rule, the oil can be bled off directly through this outlet or branch 20.

Calling attention now to Figure 6 it will be observed that the hollow plug valve element is denoted by the numeral 27. This is of general frusto-conical design and is open at its intake end as indicated at 28 in Figure 5. In one side it is provided with a restricted valve slot 29. It also includes a cylindrical trunnion or pintle 30 having a slot 31 formed therein. This slot is adapted to accommodate the wedge key 32. One side of the key is substantially flat to bear against the abutment disk 23 as indicated in Figures 2 and 3. This valved element 27 fits into the tapered portion of the main casting or body 18 as shown in the drawings. The trunnion 30 fits rotatably in the bearing branch 21 and extends outwardly beyond it to accommodate the control key 32.

When the control slot 29 is in the position shown in Figure 2 this diverts the oil from the well tubing into the pipe line by way of the pipe section 13 as is evident. This provides the "control" feature. When the slot is in the upper position shown in Figure 3 this diverts the incoming oil through the branch 20 for bleeding and testing purposes. When the slot is in the off position shown in Figure 4, it functions as a cut-off as is evident. Incidentally the passage 33 shown in Figure 4 is a drain.

It is evident that the adoption and use of this simple and economical three-way valve is a revelation in this method of handling fluid from well tubing. The point of outstanding worth in the invention has to do with the hollow slotted tapered valve unit or element 27 and cooperating wedge key 32 and abutment surface 23. It is evident that by taking a hammer or the like and tapping on the bottom of the key as indicated in Figure 2, this will loosen the key from its locked position. Then by tapping the impact end of the journal 30, this will drive the element 27 into the casing sufficiently to loosen it for easy turning. Then it can be turned to any one of the three desired positions. When the desired position is reached, the key is again driven down into binding engagement with the abutment face 23 which draws the valve element out in its casing to a tight non-turning position. Consequently it is unnecessary, in a construction of this kind to use wrenches and makeshift tools in opening and closing the valve. It is substantially compensating in action and avoids leakage by the continual wear take-up produced by the coaction of the wedge key 32 going through the slot 31 and bearing against the face 23.

The invention is susceptible of accomplishing numerous commercial features and advantages. It is believed unnecessary, however, to go into these since the novelty, from a structural point, will be visualized from the succeeding claims.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim as my invention:

1. In a flowing oil well characterized by a well casing, oil tubing through which the oil flows, and a delivery pipe; the combination with the aforesaid elements of a single valve casing having an inlet port connected with the tubing and having no less than two outlet ports, one of said outlet ports adapted for bleeding the flowing oil and the other connected with said delivery pipe, a rotary valve in the casing which in one position permits the oil to be bled, in another position allows the oil to flow into the delivery pipe, and in the third position cuts off the flow of oil entirely, and wedging means carried by the valve to lock the same in any desired position.

2. Means for controlling the flow of oil from the well tubing to the delivery line conductor comprising a single valve casing formed with a continuous bore opening on each side of the casing, the walls of the casing around one end of the bore forming a smooth lip, said valve casing having an inlet port equipped with a union fitting connected with the well tubing through which the oil flows into the valve bore, said valve casing further having no less than two radially disposed outlet ports spaced from each other at a distance greater than the width of either port and registering with the bore through one of which ports oil may be bled for testing purposes, the other of said outlet ports being connected with the delivery line conductor, a rotary core mounted in said bore, said core formed of an open-bottomed hollow cone valve on one end merging at the apex with a valve stem, said cone valve having the open bottom directed toward the inlet port and having an opening in the side wall in alignment with said outlet ports and being of an area limited to the size of one outlet port, said stem journaled in the bore outwardly of the outlet ports and having a radially slotted projecting end, and a rigid wedge-shaped locking handle extending through the slot and bearing on the lip in locked relation.

FORD WAGONER.